(12) United States Patent
Hong et al.

(10) Patent No.: US 10,203,924 B2
(45) Date of Patent: Feb. 12, 2019

(54) DISPLAY APPARATUS, CONTROLLING METHOD THEREOF AND CONTROLLING METHOD OF DISPLAY SYSTEM

(71) Applicant: SAMSUNG ELECTRONICS CO., LTD., Suwon-si (KR)

(72) Inventors: Jin-hyuck Hong, Incheon (KR); Jae-hwang Lee, Seoul (KR); Pureunsol Ku, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 98 days.

(21) Appl. No.: 14/873,449

(22) Filed: Oct. 2, 2015

(65) Prior Publication Data
US 2016/0098240 A1 Apr. 7, 2016

(30) Foreign Application Priority Data
Oct. 2, 2014 (KR) .................. 10-2014-0133460

(51) Int. Cl.
*G06F 3/14* (2006.01)
*G09G 5/12* (2006.01)

(52) U.S. Cl.
CPC .......... *G06F 3/1423* (2013.01); *G06F 3/1446* (2013.01); *G09G 5/12* (2013.01)

(58) Field of Classification Search
CPC ........ G06F 3/1423; G06F 3/1446; G09G 5/12
USPC ......................................................... 345/1.3
See application file for complete search history.

(56) References Cited

U.S. PATENT DOCUMENTS

| 5,880,720 A | 3/1999 | Iwafune et al. |
|---|---|---|
| 6,483,986 B1 | 11/2002 | Krapf |
| 8,390,743 B2 | 3/2013 | Cheng et al. |
| 8,836,713 B2 | 9/2014 | Caskey et al. |
| 9,304,732 B2 | 4/2016 | Park et al. |
| 2004/0252400 A1 | 12/2004 | Blank et al. |
| 2005/0200626 A1 | 9/2005 | Thompson |
| 2006/0002681 A1 | 1/2006 | Spilo et al. |

(Continued)

FOREIGN PATENT DOCUMENTS

| CN | 103577136 A | 2/2014 |
|---|---|---|
| CN | 103839558 A | 6/2014 |

(Continued)

OTHER PUBLICATIONS

Communication dated Jul. 29, 2015, issued by the European Patent Office in counterpart European Application No. 14175575.1.
(Continued)

*Primary Examiner* — Mark Edwards
(74) *Attorney, Agent, or Firm* — Sughrue Mion, PLLC

(57) ABSTRACT

A display apparatus, a controlling method thereof and a controlling method of a display system are provided. The controlling method of a first display apparatus includes receiving setting information from an external storage medium in response to the first display apparatus being connected to the storage medium; and in response to the first display apparatus being set as a master device according to the setting information, transmitting reproduction time information of image contents to a second display apparatus, synchronizing the second display apparatus with the first display apparatus with respect to the image contents, and reproducing the synchronized image contents.

21 Claims, 13 Drawing Sheets

(56) References Cited

U.S. PATENT DOCUMENTS

| | | |
|---|---|---|
| 2007/0277413 A1 | 12/2007 | Bailey et al. |
| 2009/0179733 A1 | 7/2009 | Hattori et al. |
| 2009/0251599 A1 | 10/2009 | Kashyap et al. |
| 2010/0023689 A1* | 1/2010 | Kim .................. G11B 27/105 711/115 |
| 2010/0118200 A1 | 5/2010 | Gelman et al. |
| 2010/0146078 A1 | 6/2010 | Wolff et al. |
| 2010/0169458 A1 | 7/2010 | Biderman et al. |
| 2010/0202761 A1 | 8/2010 | Bhogal et al. |
| 2012/0075334 A1 | 3/2012 | Pourbigharaz et al. |
| 2012/0117590 A1 | 5/2012 | Agnihotri et al. |
| 2012/0194487 A1 | 8/2012 | Roething et al. |
| 2012/0297413 A1 | 11/2012 | Choi et al. |
| 2012/0311651 A1 | 12/2012 | Kahn et al. |
| 2013/0038509 A1* | 2/2013 | Jiang .................. G06F 3/1446 345/1.3 |
| 2013/0117121 A1 | 5/2013 | Raman et al. |
| 2014/0002327 A1* | 1/2014 | Toren .................. G06F 3/1423 345/1.1 |
| 2014/0035795 A1* | 2/2014 | Park .................. G06F 3/1431 345/1.3 |
| 2014/0149606 A1* | 5/2014 | Liu .................. H04N 21/242 709/248 |
| 2015/0067521 A1* | 3/2015 | Heo .................. G06F 3/1446 715/733 |

FOREIGN PATENT DOCUMENTS

| | | |
|---|---|---|
| EP | 1975031 A2 | 10/2008 |
| EP | 2141922 A1 | 1/2010 |
| EP | 2663086 A2 | 11/2013 |
| EP | 2693424 A2 | 2/2014 |
| EP | 2736263 A1 | 5/2014 |
| JP | 2003067325 A | 3/2003 |
| JP | 2007174611 A | 7/2007 |
| JP | 4304032 B2 | 5/2009 |
| KR | 20000063984 A | 11/2000 |
| KR | 1020040025357 A | 3/2004 |
| KR | 1020080017384 A | 2/2008 |
| KR | 1020080110083 A | 12/2008 |
| KR | 1020110029979 A | 3/2011 |
| KR | 1020120134693 A | 12/2012 |
| KR | 1020120135420 A | 12/2012 |
| WO | 2011109439 A2 | 9/2011 |

OTHER PUBLICATIONS

Communication dated Mar. 3, 2017, issued by the United States Patent and Trademark Office in counterpart U.S. Appl. No. 14/327,072.
Communication from United States Patent and Trademark Office dated Dec. 26, 2017, in U.S. Appl. No. 14/327,072.
Communication dated Dec. 28, 2017, from the State Intellectual Property Office of People's Republic of China in counterpart Application No. 201510639537.7.
Communication dated Jan. 30, 2018, from the European Patent Office in counterpart European Application No. 14175575.1.
Communication dated Aug. 29, 2017 by the United States Patent and Trademark Office in counterpart U.S. Appl. No. 14/327,072.
Communication dated Jul. 12, 2018 by the United States Patent and Trademark Office in counterpart U.S. Appl. No. 14/327,072.
Communication dated Sep. 4, 2018 by the State Intellectual Property Office of P.R. China in counterpart Chinese Patent Application No. 201510639537.7.
Communication dated Oct. 10, 2018, issued by the European Patent Office in counterpart European Patent Application No. 14175575.1.

* cited by examiner

```xml
<?xml version="1.0" encoding="UTF-8"?>
- <rsp state="ok">
    <policy period="120" wait="10" sync="30" ntp="60" log="10" />
    - <project id="1000" version="1" item_count="1" total_size="1498113720" expiration="2014-12-31">
        - <schedule start_time="00:00:00" end_time="24:00:00">
            - <item id="10001" order="0">
                - <name>
                    <![CDATA[ TF4_3Screens_01TV]]>
                  </name>
                  <download_url />
                  <size>1498113720</size>
                  <format>ts</format>
                  <crc />
              </item>
          </schedule>
          <rech_info IsMaster="1" NumOfPlayer="3" IPAddrOfMaster="192.168.0.2" IPType="1" IPAddr="192.168.0.2"
              Subnetmask="255.255.255.0" Gateway="192.168.0.1" />
      </project>
  </rsp>
```

```xml
<?xml version="1.0" encoding="UTF-8" ?>
<rsp state="ok">
  <policy period="120" wait="10" sync="30" ntp="60" log="10" />
  <project id="1000" version="1" item_count="1" total_size="1498113720" expiration="2014-12-31">
    <schedule start_time="00:00:00" end_time="24:00:00">
      <item id="10001" order="0">
        <name>
          <![CDATA[ TF4_3Screens_02TV]]>
        </name>
        <download_url />
        <size>1498113720</size>
        <format>ts</format>
        <crc />
      </item>
    </schedule>
    <rech_info IsMaster="0" NumOfPlayer="3" IPAddrOfMaster="192.168.0.2" IPType="1" IPAddr="192.168.0.3"
      Subnetmask="255.255.255.0" Gateway="192.168.0.1" />
                  410
  </project>
</rsp>
```

DISPLAY APPARATUS, CONTROLLING METHOD THEREOF AND CONTROLLING METHOD OF DISPLAY SYSTEM

CROSS-REFERENCE TO RELATED APPLICATIONS

This application claims priority from Korean Patent Application No. 10-2014-0133460, filed in the Korean Intellectual Property Office on Oct. 2, 2014, the disclosure of which is incorporated herein in its entirety by reference.

BACKGROUND

1. Field

Apparatuses and methods consistent with exemplary embodiments relate to synchronizing images displayed on a plurality of display apparatuses, and controlling the plurality of display apparatuses.

2. Description of the Related Art

There is a case where a plurality of display apparatuses are displayed for sale in an electronics store. Also, there is a case where a plurality of display apparatuses display images simultaneously for aesthetic or promotion purposes in various places such as exterior wall of a building, event hall, and etc.

Accordingly, various methods are used to synchronize images reproduced by a plurality of display apparatuses. However, if image contents are downloaded from the Internet wirelessly and a synchronization signal is shared among the plurality of apparatuses, the plurality of display apparatuses may experience delays. In an electronics store, on an exterior wall of a building, in an event hall, and etc., it is necessary that the plurality of display apparatuses change and display image contents conveniently rather than displaying the same images all the time.

Accordingly, it is a need for a method for reproducing image contents which are easily changeable in a plurality of display apparatuses with low costs.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a method for controlling a first display apparatus, including: receiving setting information from an external storage medium in response to the first display apparatus being connected to the storage medium; and in response to the first display apparatus being set as a master device according to the setting information, transmitting reproduction time information of image contents to a second display apparatus, synchronizing the second display apparatus with the first display apparatus with respect to the image contents, and reproducing the synchronized image contents.

The reproducing may include reproducing the image contents and transmitting a reproduction command to the second display apparatus.

The synchronizing may include counting time elapsed from a starting point of reproduction, and transmitting the counted time to the second display apparatus, and synchronizing the image contents.

The setting information may include at least one of information to determine whether the first display apparatus is a master device or a slave device, information on the number of display apparatuses set as the slave device, the number of the image contents, reproduction time, and internet protocol (IP) information of a display apparatus set as the master device.

The reproducing may further include, in response to a connection between the first display apparatus set as the master device and the storage medium being released while reproducing the image contents, stopping reproduction of the first display apparatus and the second display apparatus.

The method may further include, in response to a user command to change a reproducing status of the image contents being input while reproducing the image contents, changing the reproducing status of the image contents according to the user command; and transmitting the user command to the second display apparatus.

The external storage medium may be a Universal Serial Bus (USB) memory.

According to another aspect of an exemplary embodiment, there is provided a first display apparatus including: an interface configured to connect to an external storage medium; a communicator configured to perform communication with a second display apparatus; a display configured to reproduce image contents; and a controller configured to, in response to the display apparatus being set as a master device according to setting information input from the external storage medium, control the display to transmit reproduction time information of image contents to the second display apparatus, synchronize the second display apparatus with the first display apparatus with respect to the image contents, and reproduce the synchronized image contents.

The controller may be further configured to, in response to a connection request being received from the second display apparatus through the communicator, control the display to reproduce the image contents, and control the communicator to transmit a reproduction command to the second display apparatus.

The controller may be further configured to control to synchronize the second display apparatus with the first display apparatus by counting time elapsed from a starting point of reproduction, transmitting the counted time to the second display apparatus, and synchronizing the image contents.

The setting information may include at least one of information to determine whether the first display apparatus is a master device or a slave device, information on the number of display apparatuses set as the slave apparatus, the number of the image contents, and reproduction time, and internet protocol (IP) information of a display apparatus set as the master device.

The controller may be further configured to, in response to a connection between the first display apparatus set as the master device and the storage medium being released while reproducing the image contents, control to stop reproduction of the first display apparatus and the second display apparatus.

The apparatus may further include an input unit, and the controller may be further configured to, in response to a user command to change a reproducing status of the image contents being input through the input unit while reproducing the image contents, control the communicator to change the reproducing status of the image contents according to the user command, and transmit the user command to the second display apparatus.

The external storage medium is a Universal Serial Bus (USB) memory.

According to another aspect of an exemplary embodiment, there is provided a method for controlling a plurality of display apparatuses including: connecting each of the plurality of display apparatuses to an external storage medium including setting information through a communications network; reproducing image contents by each of the plurality of display apparatuses; transmitting, by one of the plurality of apparatuses set as a mater device according to the setting information, reproduction time information with respect to the image contents to at least another one of the plurality of apparatuses through the communications network; and synchronizing the image contents reproduced by the plurality of display apparatuses according to the time information.

According to another aspect of an exemplary embodiment, there is provided a method of reproducing an moving image by a display apparatus including: determining the display apparatus as a master device based on connection setting information; transmitting the connection setting information to slave devices; transmitting an image reproduction command and synchronization time information to the slave devices in response to connection request being received from the slave devices; dividing the image into a plurality of sub-images based on the number of the slave devices; and reproducing one of the plurality of sub-images according to the synchronization time information.

The connection setting information enables the slave devices to recognize the display apparatus as the master device and operate in a slave device mode.

According to the above-described various exemplary embodiments, a user may connect a storage medium to each display apparatus, and thereby easily control to synchronize images reproduced in a plurality of display apparatuses.

BRIEF DESCRIPTION OF THE DRAWINGS

The above and/or other aspects will be more apparent by describing certain exemplary embodiments, with reference to the accompanying drawings, in which:

FIGS. 4A and 4B are views illustrating setting information according to an exemplary embodiment;

DETAILED DESCRIPTION

Figure 1A:
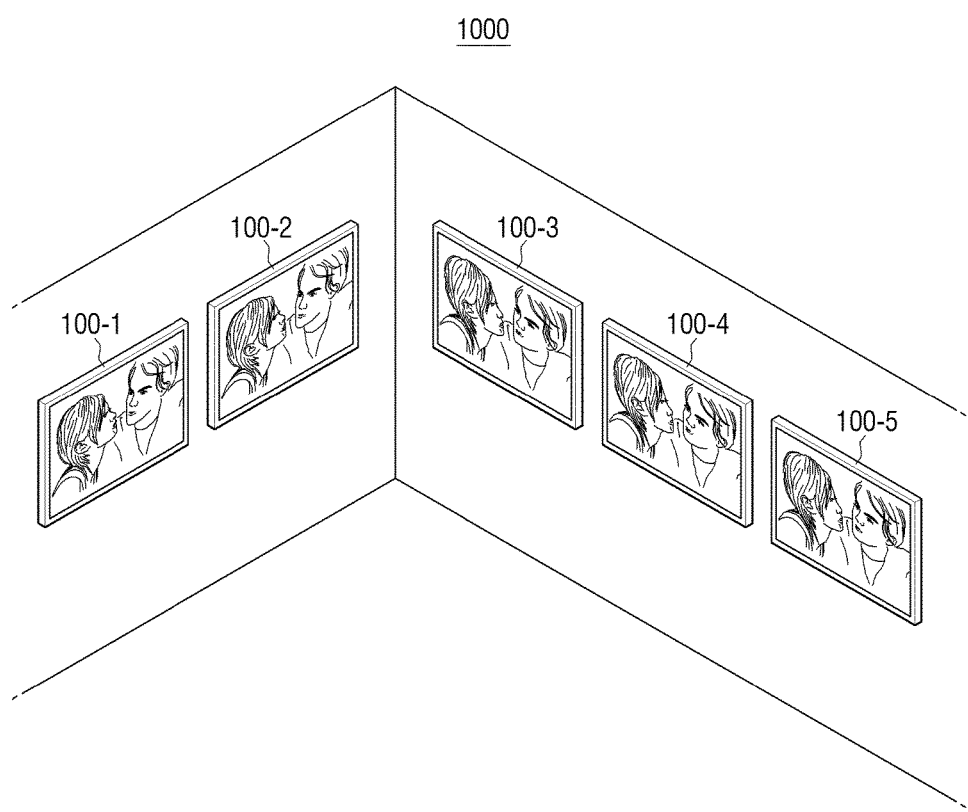
FIGS. 1A to 1C are views illustrating display systems of a plurality of display apparatuses according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Figure 1B:
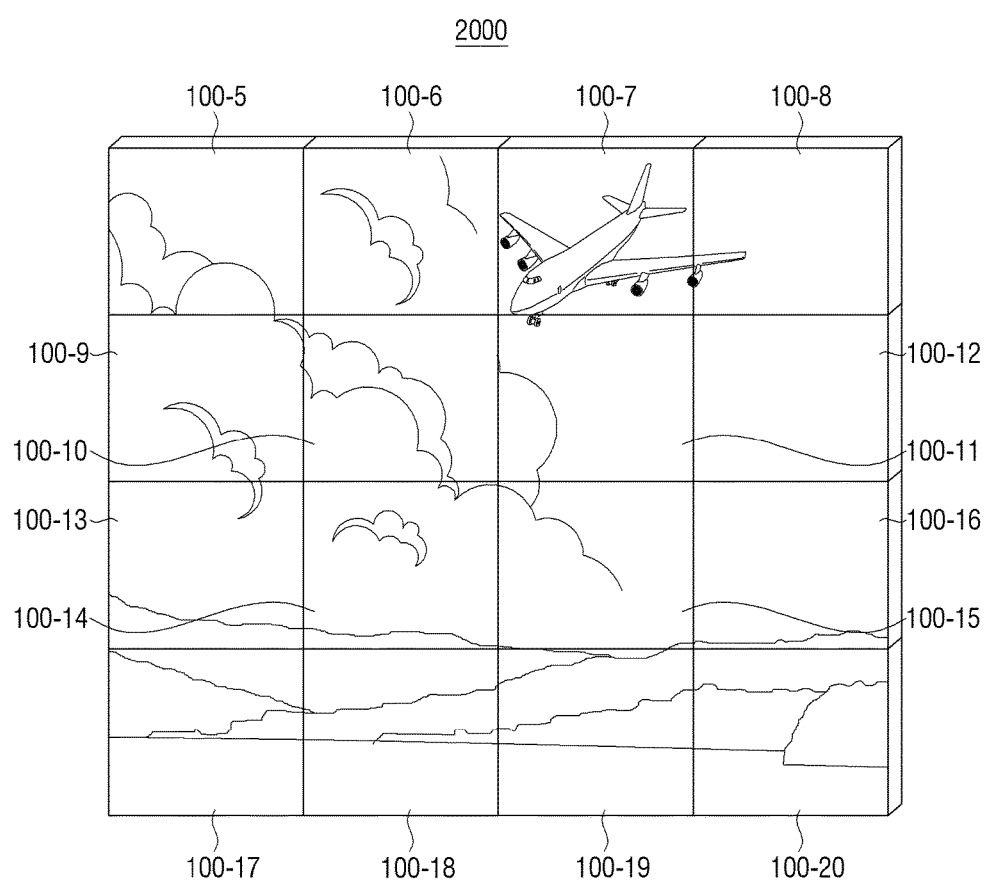
Figure 1C:
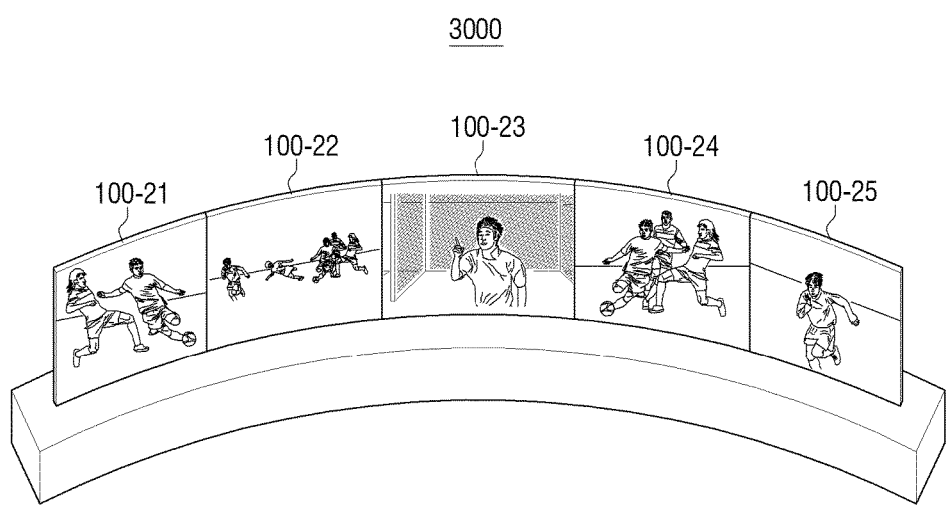

FIGS. 1A to 1C are views illustrating display systems 1000, 2000, and 3000 including a plurality of display apparatuses which may be realized in various forms according to an exemplary embodiment.

FIG. 1A is a view illustrating a portion of an electronics store where a plurality of display apparatuses 100-1 to 100-5 are displayed. That is, an electronics store for selling display apparatuses may have the plurality of display apparatuses 100-1 to 100-5, wherein each of the plurality of display apparatuses 100-1 to 100-5 may display the same images.

In this case, it is not necessary that each of the plurality of display apparatuses 100-1 to 100-5 should be of the same models or types. Accordingly, the display apparatuses may be TVs having different functions. In addition, FIG. 1A illustrates an exemplary embodiment where all of the plurality of display apparatuses 100-1 to 100-5 are realized as TVs, but this is only an example. The display apparatuses may be realized as various electronic apparatuses including a display such as mobile phone, plasma display panel (PDP), personal digital assistant (PDA), tablet personal computer (PC), home theater, digital camera, camcorder, notebook PC, refrigerator, washing machine, and so on.

In addition, FIG. 1A only illustrates the five display apparatuses 100-1 to 100-5. However, in an actual electronics store, numerous display apparatuses may display images simultaneously. Accordingly, it is necessary that image contents reproduced in the plurality of display apparatuses should be synchronized.

Meanwhile, FIG. 1B is a view illustrating a display system 2000 according to another exemplary embodiment. In particular, FIG. 1B illustrates the case where the display system 2000 is realized as a plurality of display apparatuses 100-5 to 100-20 respectively configured to display different parts of an image.

As illustrated in FIG. 1B, reproduction of the different parts of the image is synchronized among the plurality of displays 100-5 to 100-20 so that viewers may perceive the different parts of the image as a single continuous image displayed on one large display screen. Specifically, one of the displays 100-5 to 100-20 may be designated as a master device and the remaining displays may be designated as slave devices. For example, if the display 100-5 is a master device and the displays 100-6 to 100-20 are slave devices according to connection setting information, the slave displays 100-6 to 100-20 may transmit connection requests to the master display 100-5 and the master display 100-5 may transmit an image reproduction command and synchronization time information to the slave displays 100-6 to 100-20 in response to the connection requests. The master display 100-5 may determine the number of displays through which the entire image is to be displayed. For example, the master display 100-5 may determine the number of the slave displays 100-5 to 100-20 as 15 and therefore recognize the number of displays for the entire image as 16, including the master display 100-5 itself. The master display 100-5 may divide the entire image into 16 sub-images and reproduce one of the 16-images according to the synchronization time information which is shared with the slave displays 100-6 to 100-20. In addition, as illustrated in FIG. 1C, a plurality of displays 100-21 to 100-25 may display different image contents associated with each other, and thereby realize a large display screen 3000. In order to display images configured according to a user intention, it is necessary that each of the plurality of displays 100-21 to 100-25, which are split screens of the large display screen 3000, synchronize reproduction of the images.

Accordingly, a display system including a plurality of display apparatuses may synchronize images reproduced through a plurality of display apparatuses by using a method for connecting with an external storage medium including image contents and setting information.

Hereinafter, a configuration of a display apparatus 100 included in a display system will be explained in greater detail with reference to FIG. 2.

Figure 2:
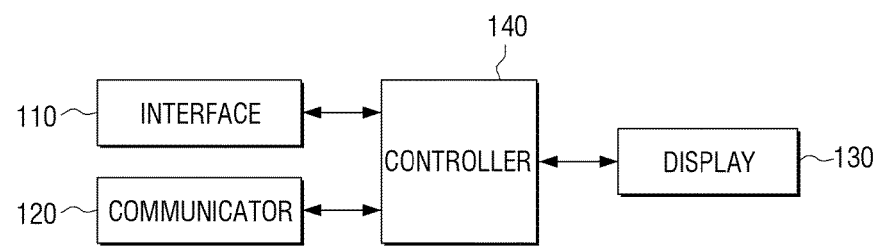
FIG. 2 is a block diagram illustrating configuration of a display apparatus according to an exemplary embodiment.

As illustrated in FIG. 2, the display apparatus 100 includes an interface 110, a communicator 120, a display 130 and a controller 140.

The interface 110 is a component for connecting an external storage medium and the display apparatus 100. That is, the display apparatus 100 may be connected to a storage medium such as Universal Serial Bus (USB) memory, memory card, or external hard drive through the interface 110. Specifically, the interface 110 may be realized as a USB interface. In addition, the display apparatus 100 may be connected not only to an external storage medium but also to another electronic apparatus including a storage through the interface 110.

An external storage medium such as a USB memory may include image contents to be displayed on the display apparatus 100, and setting information. In this case, the image contents may include all types of image contents displayable on the display apparatus. Alternatively, the external storage medium may be a storage provided by a service provider and accessible via the Internet.

In addition, the setting information may include information to determine whether the display apparatus is a master device or a slave device, information on the number of display apparatuses set as slave devices of a display system, the number of image contents to be reproduced in each display apparatus, and reproduction time, and internet protocol (IP) information of a display apparatus set as a master device, IP information of the display apparatus connected to an external storage medium, and so on.

The communicator 120 is a component for performing communication with at least one other display apparatus. That is, the display apparatus 100 may be connected to another display apparatus through the communicator 120.

Specifically, the display apparatus 100 may be connected to another display apparatus via a local area network (LAN) cable. In addition, the display apparatus 100 may be wirelessly connected to another display apparatus by using a local network.

If a plurality of display apparatuses exist, the display apparatus 100 may transmit a synchronization command to synchronize reproduction time of the other display apparatuses and reproduction time of image contents through the communicator 120. Accordingly, the display apparatus 100 may not be connected to a separate Internet. However, the display apparatus 100 may be connected to a separate Internet through the communicator 120 in order to receive image contents and various information from a broadcasting station, a separate external server, and so on.

Also, the communicator 120 may enable the display apparatus 100 to access the external storage medium through the Internet wirelessly.

The display 130 is a component for displaying image contents. The display 130 may display contents received through a broadcast channel. That is, the display apparatus 100 may receive various broadcast signals transmitted from a broadcasting station through an radio frequency (RF) communications network, and as well receive contents from various servers through an IP network, wherein the display 130 may display the received contents.

In particular, the display 130 may display image contents input through an external storage medium. That is, if the display apparatus 100 is connected to a storage medium in which image contents are stored, the display 130 may display the image contents stored in the storage medium.

In addition, the display 130 may display various user interfaces (UIs). In particular, the display 130 may be connected to other display apparatuses, and display a UI to receive input of a user command to reproduce image contents.

Meanwhile, the controller 140 is a component to control overall operations of the display apparatus 100. In particular, the controller 140 may, in response to the display apparatus 100 being set as a master device according to setting information input from the external storage medium, control the display 130 to transmit reproduction time information of image contents to at least one other display apparatus, to synchronize the at least one other display apparatus with the image contents, and to reproduce the synchronized image contents. The display apparatus 100 may be elected from a group of eligible other display apparatuses as a master and the non-elected display apparatuses may operate as slave. The master display apparatus 100 may have unidirectional control over the slave display apparatuses and send reproduction time information (e.g., synchronization signals) to the slave display apparatuses.

In addition, in response to the display apparatus 100 being set as a slave device according to setting information input from an external storage medium, the controller 140 may control to receive reproduction time information from a master device, and to synchronize reproduction of image contents.

Specifically, if a connection request is received from at least one other display apparatus through the communicator 120, the controller 140 may control the display 130 to reproduce the image contents, and control the communicator 120 to transmit a reproduction command to the at least one other display apparatus.

In addition, the controller 140 may synchronize the at least one other display apparatus and the image contents to count time elapsed from a starting point of reproduction. That is, the controller 140 may, while reproducing the image contents, control to transmit the counted time to the at least one other display apparatus to synchronize the image contents.

In addition, the controller 140 may, while reproducing the image contents, control to extract reproduction time information of image contents currently displayed, and to transmit the extracted reproduction time information to at least one other display apparatus to synchronize the image contents at predetermined time intervals.

In addition to the above-described method, various methods may be used to extract information on reproduction time of image contents being reproduced.

Meanwhile, the display apparatus 100 may further include an input unit to receive a user command. That is, the display apparatus 100 may receive a user command to change a reproducing status of an image content through the input unit.

If a user command to change a reproducing status of an image content is input through the input unit, the controller 140 may change the reproducing status of a displayed image content according to the user command. For example, if a user command to pause reproduction of a displayed image content is input through the input unit, the controller 140 may control the display 130 to pause reproduction of the image content. In addition, the controller 140 may control the communicator 120 to transmit the user command to at least one other display apparatus.

Accordingly, all of the display apparatuses included in a display system may be controlled by receiving a user command through the input unit of the display apparatus 100 set as the master device.

Meanwhile, if a connection of an external storage medium, such as a USB memory, connected to the display apparatus 100 set as the master device is released while reproducing image contents, the controller 140 of the display apparatus 100 set as the master device may control to stop the reproduction of the image contents. In addition, the controller 140 may control the communicator 120 not to transmit reproduction time information to at least one other display apparatus. At least one other display apparatus set as the slave device may, when a receipt of reproduction time information received at predetermined time intervals stops, stop the reproduction of the image contents.

As a result, the reproduction of the image contents stops in the display apparatus set as the master device and the at least one other display apparatus set as the slave device, respectively.

However, if image contents displayed in a plurality of display apparatuses are image contents stored in each of the plurality of display apparatuses instead of contents stored in an external storage medium, the display apparatus 100 set as the master device is able to transmit the reproduction time information through a communications network, and thus, the reproduction of the image contents may be continued.

On the other hand, if a connection with an external storage medium such as a USB memory connected to a display apparatus set as the slave device is released, the plurality of display apparatuses may continue reproducing the image contents. That is, the reproduction of the image contents may be only stopped in the corresponding slave display device disconnected from the storage medium.

If the connection with the storage medium is resumed with respect to the slave display device which was disconnected from the storage medium, the slave display device may synchronize the image contents with the other display apparatuses according to reproduction time information received from the display apparatus 100 set as the master device to reproduce the synchronized image contents.

Hereinafter, a method for synchronizing image contents and displaying the synchronized image contents by a plurality of display apparatuses in a display system will be explained in greater detail with reference to FIGS. 3A and 3B.

Figure 3A:
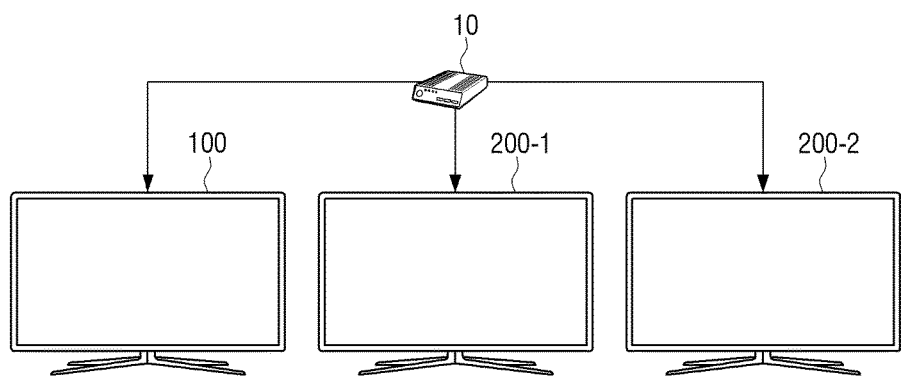
FIG. 3A is a view illustrating a display system connected by a communications network according to an exemplary embodiment.

As illustrated in FIG. 3A, a plurality of display apparatuses 100, 200-1, and 200-2 in a display system may be connected through a wireless or wired communications network. That is, the plurality of display apparatuses 10, 200-1, and 200-2 may be connected through a router 10 to realize a wireless or wired communications network.

Specifically, the plurality of display apparatuses 100, 200-1, and 200-2 may be connected via a LAN cable, or wirelessly connected through a local network.

Figure 3B:
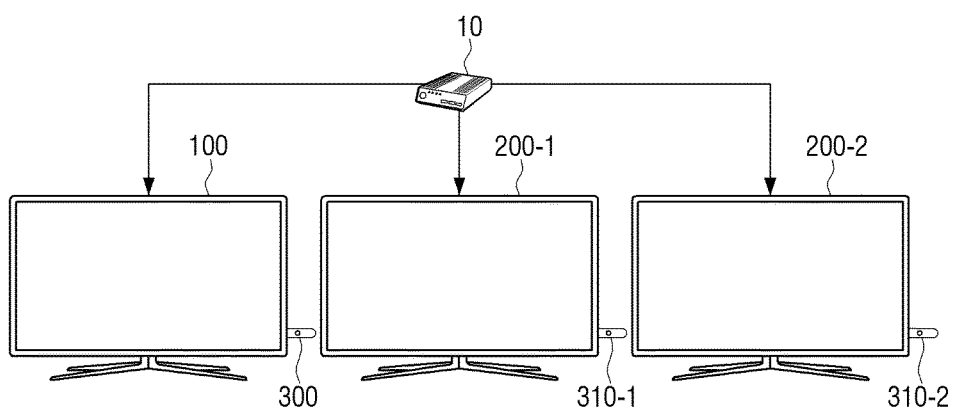
FIG. 3B is a view illustrating a plurality of display apparatuses each which connects to an external storage medium via a communication network.

FIG. 3B is a view illustrating configuration where USB memories 300, 310-1, and 310-2 are connected to the plurality of display apparatuses 100, 200-1, and 200-2 as storage media according to an exemplary embodiment. That is, in order to synchronize reproduction of image contents, each of the plurality of display apparatuses 100, 200-1, and 200-2 is respectively connected to the USB memories 300, 310-1, and 310-2 including image contents and setting information. An USB memory is connected as a storage medium, but this is only an example. Various types of storage media such as memory card, external hard drive, and so on may be used, and a small electronic apparatus including a storage may be connected and used as well.

Each of the USB memories 300, 310-1, and 310-2 may store image contents and setting information. The image contents include various types of image contents having a form displayable on a display apparatus. In addition, at least one image content included in each of the USB memories 300, 310-1, and 310-2 may be image contents different from each other, and yet, may have the same reproduction time.

Meanwhile, the setting information may include information to determine whether a display apparatus connected to a storage medium is a master device or a slave device, information on the number of display apparatuses set as slave devices in a display system, the number of image contents to be reproduced in each display apparatus, and reproduction time, IP information of a display apparatus set as a master device, IP information of the display apparatus connected to a storage medium, and so on.

Specifically, each of the USB memories 300, 310-1, 310-2 may include the setting information as illustrated in FIGS. 4A and 4B. In particular, each of the display apparatuses connected to a USB memory may be configured to determine whether it is a master device or a slave device by using the information as in reference numeral 400 of FIG. 4A and reference 410 of FIG. 4B of the setting information.

As illustrated in FIG. 4A, the display apparatus 100 connected to the USB memory 300 including setting information 400 indicating that the display apparatus is a master device is configured to play a role of master device. Accordingly, the display apparatus 100 may figure out the number of connected slave devices from the setting information. Then, the display apparatus 100 may be on standby until it receives as many connection requests as the number of slave apparatuses included in the setting information.

Meanwhile, as illustrated in FIG. 4B, the display apparatuses 200-1 and 200-2 connected to the USB memories 300-1 and 300-2 including setting information 410 indicating that they are slave devices are configured to play a role of slave devices.

Accordingly, since the USB memories 300-1 and 300-2 include an IP address of the master device, the display apparatuses 200-1 and 200-2 set as the slave devices may transmit connection requests to an IP address of the master device.

The display apparatus 100 as the master device may, when a connection request is received from all of the slave devices 200-1 and 200-2, reproduce image contents and transmit a reproduction command to the other slave devices 200-1 and 200-2 to reproduce the image contents. That is, the master display apparatus 100 may, while controlling to sequentially reproduce image contents stored in the USB memory 300 through the display 130, transmit a reproduction command to sequentially reproduce image contents stored in the USB memories 310-1 and 310-2 to the slave devices 200-1, 200-2.

Each of the USB memories 300, 310-1, and 310-2 may include a plurality of image contents. Accordingly, the master display apparatus 100 may control each display apparatus to sequentially reproduce the image contents stored in each USB memory.

In addition, the master display apparatus 100 may control each display apparatus to randomly reproduce the image contents stored in each USB memory; however, it may be the case where each USB memory includes information on a reproduction order of the image contents or the case where the plurality of image contents stored in each USB memory have the same reproduction time.

Meanwhile, other than the image contents stored in each of the USB memories 300, 310-1, and 310-2, the plurality of display apparatuses 100, 200-1, and 200-2, may, in response to being connected to different communications networks, reproduce image contents downloaded from an external server or image contents downloaded wirelessly through the Internet, as well. For example, if the plurality of display apparatuses 100, 200-1, and 200-2 are not connected to the same router 10, the plurality of display apparatuses 100, 200-1, and 200-2 may be determined as being connected to different communications networks.

Each of the plurality of display apparatuses 100, 200-1, and 200-2 may download image contents from an external server or apparatus, and share reproduction time information through a wired or wireless communications network for connecting each of the plurality of display apparatuses.

Meanwhile, the master display apparatus 100 may count time elapsed from a starting point of reproduction of image contents. In addition, according to predetermined intervals, the master display apparatus 100 may transmit information on the counted reproduction time to the slave display devices 200-1 and 200-2.

For example, if the master display apparatus 100 counts elapsed time since a reproduction of image contents started as 00:07:15, the master display apparatus 100 may transmit reproduction time information of "00:07:15" to the slave display devices 200-1 and 200-2 through the above-described wired or wireless communications network. That is, the master display apparatus 100 may transmit information indicating that image contents reproduced in each of the display apparatuses 100, 200-1, and 200-2 display a frame corresponding to 00:07:15 to the slave display devices 200-1 and 200-2.

Each of the slave display devices 200-1 and 200-2 which received the reproduction time information may, if reproduction time of displayed images is not "00:07:15," control to change the reproduction time to "00:07:15," and thereby synchronize the reproduced images.

The master display apparatus 100 may transmit reproduction time information to each of the slave display devices 200-1 and 200-2 at short time intervals such as 10 ms. Accordingly, a synchronization of reproduced images may be provided more accurately.

Meanwhile, if a user command to control reproduction of the image contents is input through the input unit of the master display apparatus 100, the display apparatus 100 may transmit the user command to the slave display devices 200-1 and 200-2 through a communications network as well.

Accordingly, the user may input the user command with respect to the master device only, and thereby control the plurality of display apparatuses easily.

Meanwhile, the user may group and control a plurality of display apparatuses easily by using a storage medium such as a USB memory. Specifically, the user may respectively connect, with respect to a plurality of display apparatuses to display image contents A, a USB memory including the image contents A and setting information, respectively connect, with respect to a plurality of display apparatuses to display image contents B, a USB memory including the image contents B and setting information, and thereby control the plurality of display apparatuses by grouping them into a display system configured to reproduce 'A' contents and a display system configured to reproduce 'B' contents.

For example, in an electronics store, if a display apparatus displayed on the east wall of the first floor displays the image contents 'A,' and display apparatuses displayed on the west, south, and north walls of the first floor display the image contents 'B,' and a display apparatus displayed on the second floor displays the image contents 'C,' the user may simply connect the storage medium in which the image contents 'A' is stored to the display apparatus displayed on the east wall of the first floor, connect the storage media in which the image contents 'B' is stored respectively to the display apparatuses displayed on the west, south, and north walls of the first floor, connect the storage medium in which the image contents 'C' is stored to the display apparatus displayed on the second floor, and thereby group display systems easily.

Figure 5:
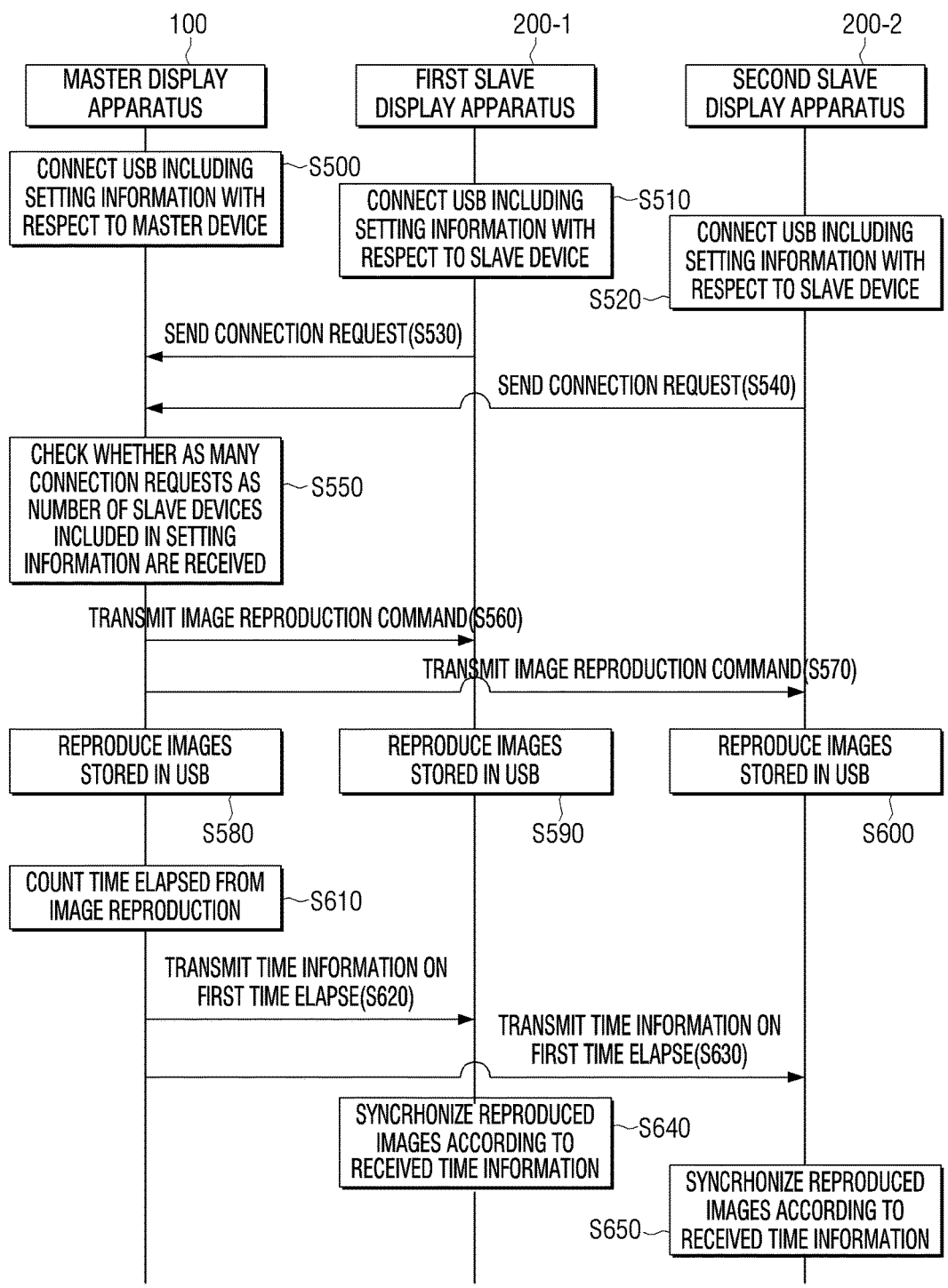
FIG. 5 is a sequence diagram provided to explain a method for synchronizing images reproduced by a display system according to an exemplary embodiment.

Meanwhile, FIG. 5 is a sequence diagram provided to explain a synchronizing method of reproduced images of a display system according to an exemplary embodiment. FIG. 5 explains a method for synchronizing reproduced images in a display system including the master display apparatus 100 and the two slave display apparatuses 200-1 and 200-2, but this is only an example. There may be only one slave display apparatus, which may also be realized as three or more display apparatuses.

The master display apparatus 100 may be connected to a USB memory including setting information with respect to a master device (operation S500). In addition, the first and second slave display apparatuses 200-1 and 200-2 are connected to USB memories including setting information with respect to slave devices (operations S510 and S520).

Setting information stored in an external storage medium such as USB memory includes information to indicate whether a display apparatus connected to a USB memory operates as a master display device or as a slave display device.

Accordingly, each display apparatus may, when connected to a USB memory, read setting information stored in the USB memory, and determine whether the apparatus itself is a master display device or a slave display device.

The first and second slave display apparatuses 200-1 and 200-2 connected to the USB memories including setting information with respect to the slave devices are configured to read an IP address of the master display apparatus 100 included in the setting information, and transmit connection requests to the corresponding IP (operations S530 and S540).

The master display apparatus 100 may read the number of to-be-connected slave devices included in the setting information. That is, the master display apparatus 100 is configured to read information indicating that there are two slave display apparatuses 200-1 and 200-2 from the setting information, and determine whether the number of received connection requests is equal to the number of slave devices included in the setting information (operation S550).

When the number of received connection requests is equal to the number of slave devices included in the setting information, the master display apparatus 100 transmits image reproduction commands to the first and second slave display apparatuses 200-1 and 200-2 (operations S560 and S570).

Setting information of the USB memory connected to the master display apparatus 100 includes IP addresses of the first and second slave display apparatuses 200-1 and 200-2. Accordingly, the master display apparatus 100 may use the IP addresses included in the setting information to transmit the image reproduction commands to the first and second slave display apparatuses 200-1 and 200-2.

The master display apparatus 100 is configured to reproduce images stored in the USB memory (operation S580). In addition, the first second slave display apparatuses 200-1 and 200-2 which receive the image reproduction commands are configured to reproduce images stored in the USB memories as well (operations S590 and S600).

The master display apparatus 100 is configured to count time elapsed from a starting point of reproduction of the images (operation S610). Then, at predetermined time intervals, the master display apparatus 100 may transmit information about the reproduction time.

Specifically, if a first predetermined time elapses, the master display apparatus 100 transmits time information about the first elapsed time to the first and second slave display apparatuses 200-1 and 200-2 (operation S620 and S630). In particular, the master display apparatus 100 may simultaneously transmit the reproduction time information to at least one slave display apparatus.

The first and second slave display apparatuses 200-1 and 200-2 which receive the reproduction time information are configured to synchronize the reproduced images according to the received time information (S640 and S650). For example, each of the slave display apparatuses 200-1 and 200-2 may receive the reproduction time information at 50 ms intervals. That is, when reproduction time information indicates that the elapsed time since the image contents starts reproducing is "00:00:50", each slave display apparatus 200-1 and 200-2 may synchronize time points of the reproduction of the image contents to "00:00:50." In addition, when reproduction time information indicates that the elapsed time since the image contents starts reproducing is "00:01:00", each slave display apparatus 200-1 and 200-2 may synchronize time points of the reproduction of the image contents to "00:01:00."

By the above-mentioned method, the plurality of display apparatuses may receive information on the reproduction time from the master device, and synchronize the reproduced images easily.

Meanwhile, while the user is performing connection with respect to the plurality of display apparatuses, each display apparatus may display a UI so that the user may easily connect the plurality of display apparatuses.

Figure 6A:
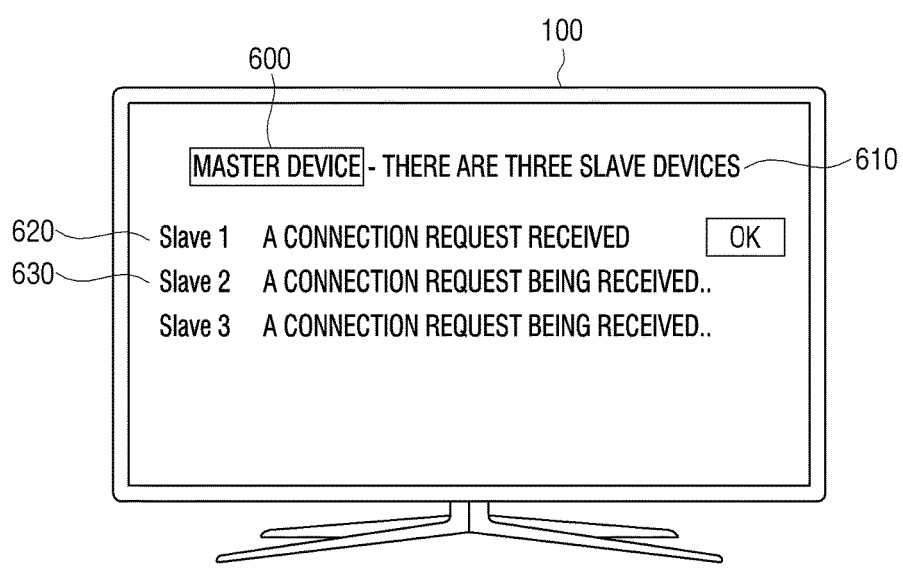
FIGS. 6A and 6B are views illustrating connection screens of a master display apparatus connected to slave display apparatus according to an exemplary embodiment.
Figure 6B:
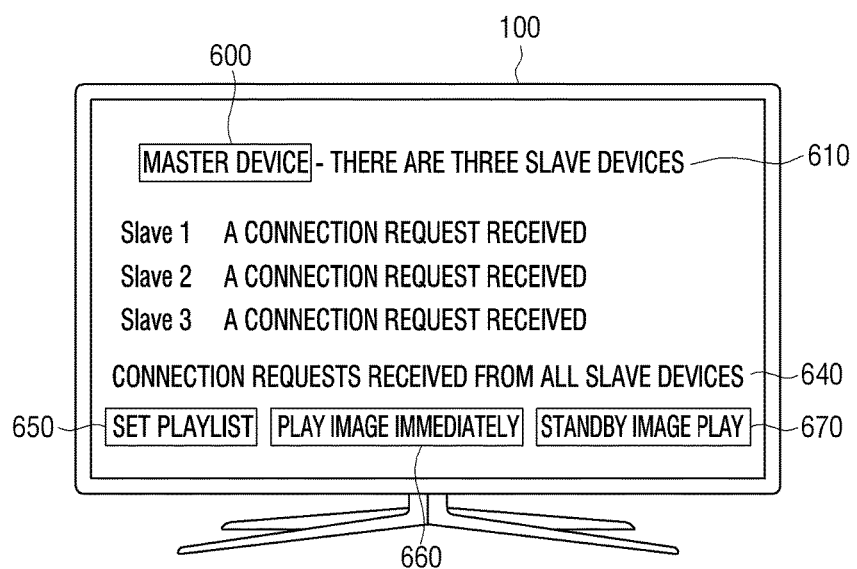

Specifically, FIGS. 6A and 6B are views illustrating connection screens to perform connection with the other display apparatuses of the master display apparatus 100.

If the display apparatus 100 is connected to an external storage medium configured to store setting information with respect to a master device, the display apparatus 100 may synchronize image contents, and read information on the number of slave display apparatuses to be reproduced.

Accordingly, as illustrated in FIG. 6A, the display apparatus 100 may read the information as the master device from the storage medium to display a UI 600 to inform that the apparatus 100 itself is the master device, and display the read information 610 on the number of slave display apparatuses.

The display apparatus 100 as the master device may be on standby until connection requests are received from all of the slave display apparatuses. Accordingly, the display apparatus 100 may display UIs 620 and 630 to inform that connection requests have been received or is being received from each slave display apparatus.

In response to connection requests having been received from all of the slave display apparatuses, as illustrated in FIG. 6B, the display apparatus 100 as the master device may display a phrase 640 such as "Connection requests have been received from all of the slave devices." to inform the user that it is ready to reproduce the image contents.

In addition, the display apparatus 100 may display a 'Set playlist UI 650,' a 'Play images immediately UI 660,' an 'Image play standby UI 670,' and so on. Accordingly, the display apparatus 100 may receive a user command to control image reproduction through a display system.

Figure 7:
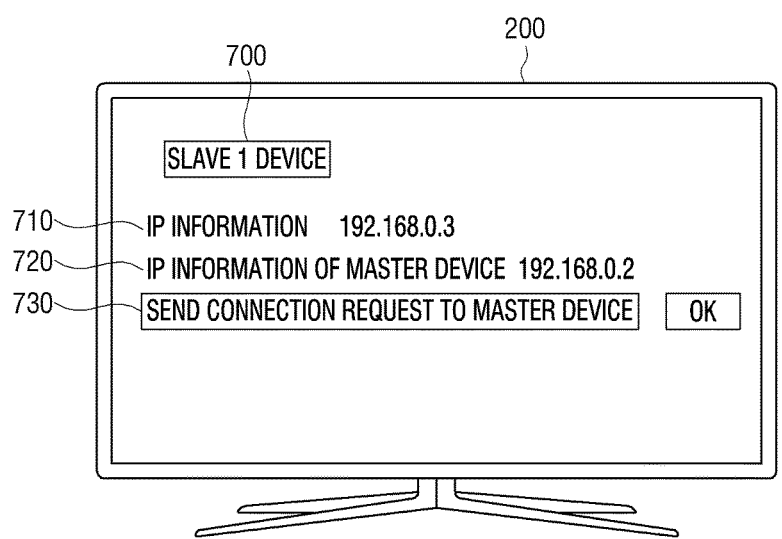
FIG. 7 is a view illustrating a connection screen of a slave display device connected to a master display device.

Meanwhile, the display apparatus 200 as a slave device may display a UI screen as illustrated in FIG. 7. That is, the display apparatus 200 as a slave device may display IP information 710 of the apparatus read from setting information and IP information 720 of the master device.

In addition, the display apparatus 200 as a slave device may display a 'Send a connection request to the master device UI 730,' in order to receive input of a command regarding whether to request a connection request from the user. Accordingly, the user may input a user command to transmit a connection request to the master device with respect to each slave display apparatus 200, and thereby control each slave display apparatus 200 to transmit the connection request to the master device.

In addition, according to settings, the display apparatus 200 as a slave apparatus may control to transmit the connection request to the master device as soon as it reads the IP of the master device, even if the user command is not input.

Figure 8:
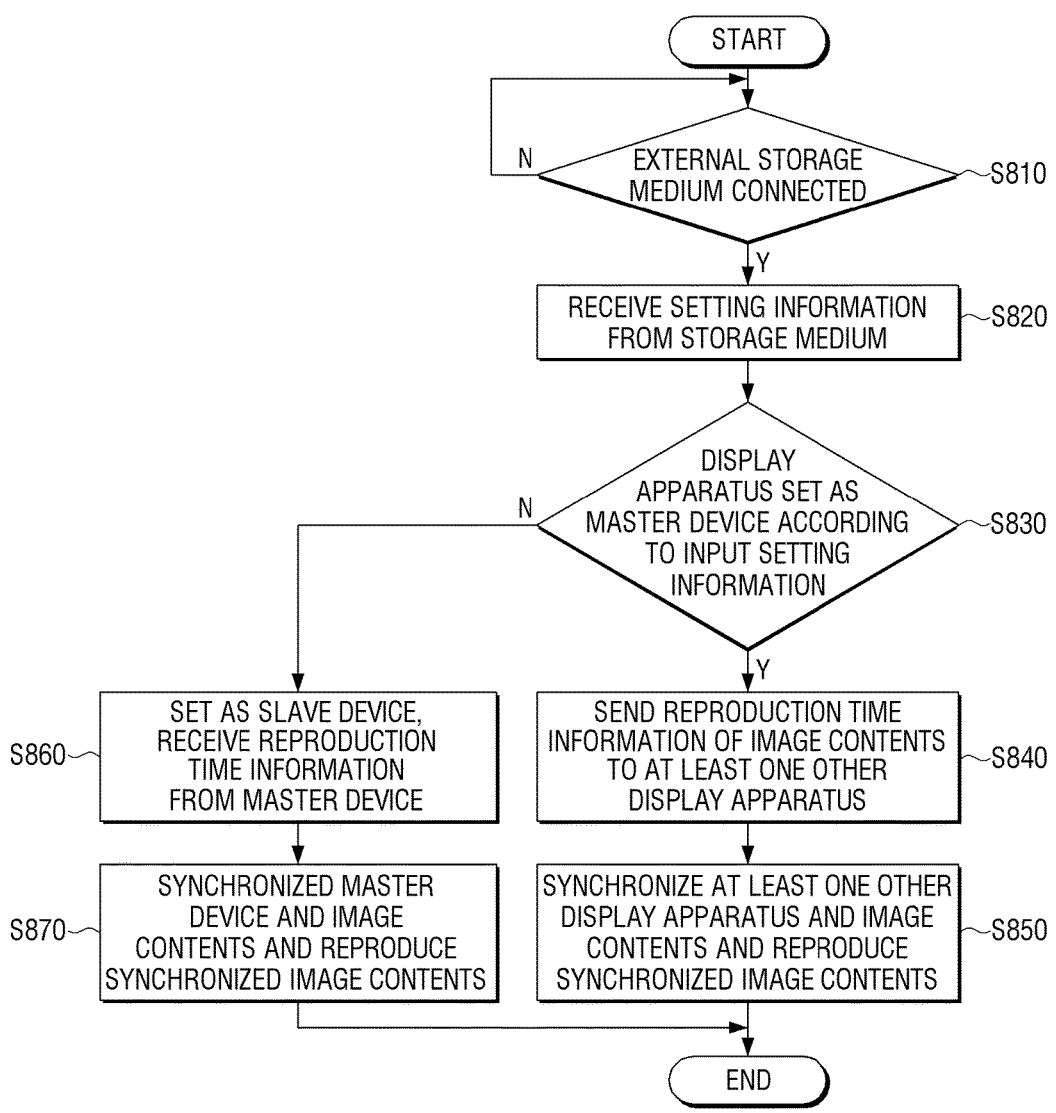
FIG. 8 is a flowchart illustrating a reproducing method of a display apparatus according to an exemplary embodiment.

Meanwhile, FIG. 8 is a flowchart illustrating a reproducing method of a display apparatus according to an exemplary embodiment.

First of all, the display apparatus 100 determines whether an external storage medium is connected (operation S810). That is, the display apparatus 100 may determine whether it is connected with a storage medium such as Universal Serial Bus (USB) memory, memory card, external hard drive, etc. In this case, the external storage medium may include other electronic apparatuses including a storage.

If an external storage medium is connected (operation S810-Y), the display apparatus 100 receives setting information from the storage medium (operation S820). In this case, the setting information may include information to determine whether the display apparatus connected to the storage medium is a master device or a slave device, information on the number of display apparatuses set as the slave devices, the number of image contents to be reproduced in each display apparatus, and reproduction time, IP address information of a display apparatus set as the master device, IP address information of the display apparatus connected to the storage medium, and so on.

Accordingly, in response to the display apparatus 100 being set as the master device according to the input setting information (operation S830-Y), the display apparatus 100 may be on standby until the display apparatus 100 receives from the slave devices the same number of connection requests as the number indicated in the setting information.

If the same number of connection requests as the number indicated in the setting information have been received from the slave devices, the display apparatus 100 may display image contents stored in the external storage medium, and transmit commands to display the image contents to the other slave display apparatuses.

In addition, the display apparatus 100 counts reproduction time of the image contents at predetermined time intervals, and transmit reproduction time information of the image contents to at least one other display apparatus (operation S840). According to the transmitted reproduction time information, the display apparatus 100 synchronizes the at least one other display apparatus and the image contents, and reproduces the synchronized image contents (operation S850).

Meanwhile, if the display apparatus is not set as the master device according to the input setting information (operation S830-N), the display apparatus is set as the slave apparatus, and receives the reproduction time information from the master device. Then, the display apparatus set as the slave device synchronizes the master device and the slave device with respect to the image contents, and reproduces the synchronized image contents by changing the reproduction time of the image contents according to the received reproduction time information (operation S870).

By the above-mentioned synchronization method of image contents, the user may connect a storage medium such as USB memory with respect to a plurality of display apparatuses to synchronize reproduced images, and thereby easily control the plurality of display apparatuses to synchronize image contents and to display the synchronized image contents.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium The foregoing embodiments and advantages are merely exemplary and are not to be construed as limiting. The present teaching can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method for controlling a first display apparatus, comprising:
   receiving setting information from an external device;
   determining whether the first display apparatus is a master device or a slave device according to the setting information;
   in response to the first display apparatus being set as the master device according to the setting information, displaying, by the first display apparatus, a connection screen including first information indicating the first display apparatus being set as the master device and second information indicating whether the first display apparatus has received a connection request from each of a plurality of second display apparatuses each set as a slave device;
   in response to connection requests having been received from all of the plurality of second display apparatuses, displaying, by the first display apparatus, a message indicating that the connection requests have been received from all of the plurality of second display apparatuses;
   transmitting reproduction time information of image content to the plurality of second display apparatuses;
   synchronizing the plurality of second display apparatuses with the first display apparatus with respect to the image content; and
   reproducing the synchronized image content.

2. The method as claimed in claim 1, wherein the reproducing comprises reproducing the image content and transmitting a reproduction command to the plurality of second display apparatuses.

3. The method as claimed in claim 1, wherein the synchronizing comprises counting time elapsed from a starting point of reproduction, and transmitting the counted time to the plurality of second display apparatuses, and synchronizing the image content.

4. The method as claimed in claim 1, wherein the setting information comprises at least one of information to determine whether the first display apparatus is a master device or a slave device, information on the number of the plurality of second display apparatuses each set as the slave device, the number of the image content, reproduction time, and internet protocol (IP) information of a display apparatus set as the master device.

5. The method as claimed in claim 1, wherein the reproducing further includes
   in response to a connection between the first display apparatus set as the master device and the external device being released while reproducing the image content, stopping reproduction of the first display apparatus and the plurality of second display apparatuses.

6. The method as claimed in claim 1, further comprising:
   in response to a user command to change a reproducing status of the image content being input while reproducing the image content, changing the reproducing status of the image content according to the user command; and
   transmitting the user command to the plurality of second display apparatuses.

7. The method as claimed in claim 1, wherein the external device is a Universal Serial Bus (USB) memory.

8. A display apparatus, comprising:
   an interface configured to receive data from an external device;
   a communicator configured to perform communication with an external display apparatus;
   a display; and
   a controller configured to determine whether the display apparatus is a master device or a slave device according to setting information received from the external device, and in response to the display apparatus being set as the master device according to the setting information received from the external device, control the display to display a connection screen including first information indicating the display apparatus being set as the master device and second information indicating whether the display apparatus has received a connection request from each of a plurality of external display apparatuses each set as a slave device, and in response to connection requests having been received from all of the plurality of external display apparatuses, control the display to display a message indicating that the connection requests have been received from all of the plurality of external display apparatuses, and wherein the controller is further configured to control the communicator to transmit reproduction time information of image content to the plurality of external display apparatuses, synchronize the plurality of external display apparatuses with the display apparatus with respect to the image content, and control the display to display the synchronized image content.

9. The apparatus as claimed in claim 8, wherein the controller is further configured to, in response to a connection request being received from each of the plurality of external display apparatuses through the communicator, control the display to reproduce the image content, and control the communicator to transmit a reproduction command to the plurality of external display apparatuses.

10. The apparatus as claimed in claim 8, wherein the controller is further configured to control to synchronize the plurality of external display apparatuses with the display apparatus by counting time elapsed from a starting point of reproduction, transmitting the counted time to the plurality of external display apparatuses, and synchronizing the image content.

11. The apparatus as claimed in claim 8, wherein the setting information includes at least one of information to determine whether the display apparatus is a master device or a slave device, information on the number of the plurality of external display apparatuses each set as the slave device, the number of the image content, and reproduction time, and internet protocol (IP) information of a display apparatus set as the master device.

12. The apparatus as claimed in claim 8, wherein the controller is further configured to, in response to a connection between the display apparatus set as the master device and the external device being released while reproducing the image content, control to stop reproduction of the display apparatus and the plurality of external display apparatuses.

13. The apparatus as claimed in claim 8, further comprising:
an input unit,
wherein the controller is further configured to, in response to a user command to change a reproducing status of the image content being input through the input unit while reproducing the image content, control the display to change the reproducing status of the image content according to the user command, and control the communicator to transmit the user command to the plurality of external display apparatuses.

14. The apparatus as claimed in claim 8, wherein the external device is a Universal Serial Bus (USB) memory.

15. A method for controlling a plurality of display apparatuses, comprising:
connecting each of the plurality of display apparatuses to an external device including setting information through a communications network, the plurality of display apparatuses including a first apparatus and a plurality of second apparatuses;

determining, by the first apparatus of the plurality of apparatuses, whether the first apparatus of the plurality of display apparatuses is a master device or a slave device according to the setting information input from the external device;

in response to the first apparatus of the plurality of apparatuses being set as the master device according to the setting information input from the external device, displaying, by the first apparatus, a connection screen including first information indicating the first apparatus being set as the master device and second information indicating whether the first apparatus has received a connection request from each of the plurality of second apparatuses each set as a slave device;

in response to connection requests having been received from all of the plurality of second apparatuses, displaying, by the first apparatus, a message indicating that the connection requests have been received from all of the plurality of second apparatuses;

reproducing image contents by each of the plurality of display apparatuses;

transmitting, by the first apparatus of the plurality of apparatuses set as the master device according to the setting information, reproduction time information with respect to the image contents to the plurality of second apparatuses through the communications network; and synchronizing the image contents reproduced by the plurality of display apparatuses according to the time information.

16. A method of reproducing a moving image by a display apparatus, the method comprising:
determining whether the display apparatus is a master device or a slave device based on connection setting information;
transmitting the connection setting information to slave devices in response to the display apparatus being set as the master device;
displaying, by the display apparatus, a connection screen including first information indicating the display apparatus being set as the master device and second information indicating whether the display apparatus has received a connection from each of the slave devices in response to the display apparatus being set as a master device;
displaying, by the display apparatus, a message indicating that connection requests have been received from all of the slave devices in response to the connection requests having been received from all of the slave devices;
transmitting an image reproduction command and synchronization time information to the slave devices in response to the connection requests being received from the slave devices;
dividing the image into a plurality of sub-images based on the number of the slave devices; and
reproducing one of the plurality of sub-images according to the synchronization time information.

17. The method as claimed in claim 16, wherein the connection setting information enables the slave devices to recognize the display apparatus as the master device and operate in a slave device mode.

18. The method as claimed in claim 1, wherein the setting information includes information on a number of display apparatuses set as slave devices, and
wherein the method further comprises:
in response to the first display apparatus being set as the master device according to the setting information, maintaining a standby state of the first display apparatus until the same number of connection requests as the number of display apparatuses indicated in the setting information are received from the display apparatuses set as slave devices, and in response to the same number of connection requests being received from the display apparatuses, displaying the image content.

19. The apparatus as claimed in claim 8, wherein the setting information includes information on a number of display apparatuses set as slave devices, and wherein the controller is further configured to:

in response to the display apparatus being set as the master device according to the setting information, maintain a standby state of the display apparatus until the same number of connection requests as the number of display apparatuses indicated in the setting information are received from the display apparatuses set as slave devices, and in response to the same number of connection requests being received from the display apparatuses, displaying the image content.

20. The method as claimed in claim 15, wherein the setting information includes information on a number of display apparatuses set as slave devices, and wherein the method further comprises:

in response to the first apparatus of the plurality of display apparatuses being set as the master device according to the setting information, maintaining a standby state of the first apparatus of the plurality of display apparatuses until the same number of connection requests as the number of display apparatuses indicated in the setting information are received from the display apparatuses set as slave devices, and in response to the same number of connection requests being received from the display apparatuses, displaying the image contents.

21. The method as claimed in claim 16, wherein the setting information includes information on a number of the slave devices, wherein the method further comprises, in response to the display apparatus being set as the master device according to the setting information, maintaining a standby state of the display apparatus until the same number of connection requests as the number of slave devices indicated in the setting information are received from the slave devices, and wherein the image reproduction command is transmitted to the slave devices in response to the same number of connection requests being received from the slave devices.

* * * * *